United States Patent

Hunt

(10) Patent No.: US 9,457,698 B2
(45) Date of Patent: Oct. 4, 2016

(54) HEADREST SUPPORT ROD AND METHOD OF MAKING A HEADREST

(71) Applicant: Nissan North America, Inc., Franklin, TN (US)

(72) Inventor: James Theodore Hunt, Canton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/192,427

(22) Filed: Feb. 27, 2014

(65) Prior Publication Data

US 2015/0239376 A1    Aug. 27, 2015

(51) Int. Cl.
| | |
|---|---|
| *A47C 7/38* | (2006.01) |
| *B60N 2/48* | (2006.01) |
| *B29C 44/18* | (2006.01) |
| *B60N 2/70* | (2006.01) |
| *B60R 11/02* | (2006.01) |
| *B29K 105/00* | (2006.01) |
| *B29K 705/00* | (2006.01) |
| *B60R 11/00* | (2006.01) |

(52) U.S. Cl.
CPC .............. *B60N 2/48* (2013.01); *B29C 44/181* (2013.01); *B60N 2/7017* (2013.01); *B60R 11/0235* (2013.01); *A47C 7/38* (2013.01); *B29K 2105/00* (2013.01); *B29K 2705/00* (2013.01); *B60N 2002/4888* (2013.01); *B60R 2011/0017* (2013.01)

(58) Field of Classification Search
CPC ....................................................... A47C 7/38
USPC ................................................ 297/410, 391
See application file for complete search history.

(56) References Cited

U.S. PATENT DOCUMENTS

| | | | |
|---|---|---|---|
| 4,830,793 A | 5/1989 | Fermigier et al. | |
| 5,730,917 A | 3/1998 | Ishikawa et al. | |
| 5,855,831 A | 1/1999 | Takei | |
| 5,967,612 A | 10/1999 | Takei | |
| 6,183,045 B1 | 2/2001 | Marfilius et al. | |
| 8,348,338 B2 * | 1/2013 | Galecka et al. | 297/216.12 |
| 8,556,342 B2 | 10/2013 | Tache et al. | |
| 2002/0074838 A1 * | 6/2002 | Whiting et al. | 297/220 |
| 2008/0191522 A1 * | 8/2008 | Maeda | B60N 2/4817 297/216.12 |
| 2012/0235460 A1 * | 9/2012 | Fey et al. | 297/410 |
| 2014/0191554 A1 * | 7/2014 | Dublan et al. | 297/410 |

FOREIGN PATENT DOCUMENTS

| | | |
|---|---|---|
| GB | 2327602 A | 2/1999 |
| GB | 2426482 A | 11/2006 |
| JP | 2008295597 A | 12/2008 |

* cited by examiner

*Primary Examiner* — Syed A Islam
(74) *Attorney, Agent, or Firm* — Global IP Counselors, LLP

(57) ABSTRACT

A headrest support rod includes a first hollow tubular portion and a second hollow tubular portion. The first hollow tubular portion includes a first end having a first opening configured to receive filler material from an injection pump, is configured to support a headrest, and is configured to be disposed at least partially outside of the headrest. The second hollow tubular portion includes an opening and is configured to be disposed at least partially inside the headrest. The first hollow tubular portion is configured to enable the filler material to be transmitted from the first opening to the second hollow tubular portion, and the second hollow tubular portion is configured so as to enable the filler material to pass through the second opening to form the headrest.

14 Claims, 10 Drawing Sheets

HEADREST SUPPORT ROD AND METHOD OF MAKING A HEADREST

BACKGROUND

1. Field of the Invention

The present invention generally relates to a headrest support rod. More specifically, the present invention relates to a headrest support rod capable of injecting filler material into a headrest mold to form the headrest.

2. Background Information

Conventional headrests can be formed by inserting a solid headrest support rod into a headrest liner. The headrest liner is then inserted into a mold. An injection system then injects foam through a foam injection hole in the headrest liner to fill the liner and form a foam block. However, it has been determined that the foam injection hole for the headrest may be visible. Thus, a need exists for an improved headrest and method of making a headrest.

SUMMARY

It has been discovered that to form an improved headrest, a hollow headrest support rod may be used to inject filler material into a headrest trim cover.

In view of the state of the known technology, one aspect of the present disclosure is to use a headrest support rod to inject filler material into the headrest trim cover, thus eliminating a dedicated filler material injection hole in the trim cover.

In one embodiment, a headrest support rod includes a first hollow tubular portion and a second hollow tubular portion. The first hollow tubular portion includes a first end having a first opening configured to receive filler material from an injection pump, is configured to support a headrest, and is configured to be disposed at least partially outside of the headrest. The second hollow tubular portion includes an opening and is configured to be disposed at least partially inside the headrest. The first hollow tubular portion is configured to enable the filler material to be transmitted from the first opening to the second hollow tubular portion, and the second hollow tubular portion is configured so as to enable the filler material to pass through the second opening to form the headrest.

In one embodiment, a headrest system includes a headrest formed from a filler material so as to form a support block, and a rod is embedded in the support block. The rod is configured to support the headrest and includes a hollow tubular body having a first portion disposed outside the headrest and a second portion disposed inside the headrest. The first portion includes a first end having an opening configured to enable the filler material from an injection pump to pass therethrough. The hollow tubular body is configured to enable the filler material to be transmitted from the first opening to the second portion, and the second portion includes an opening configured to enable the filler material to pass therethrough so as to form the headrest.

In one embodiment, a method of forming a headrest includes inserting a hollow rod into a headrest trim cover, inserting the headrest trim cover into a mold, and injecting filler material into the headrest trim cover via a first opening in a first end of the hollow rod, such that the filler material passes through the hollow rod and exits the hollow rod through a second opening in the hollow rod inside the headrest trim cover.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
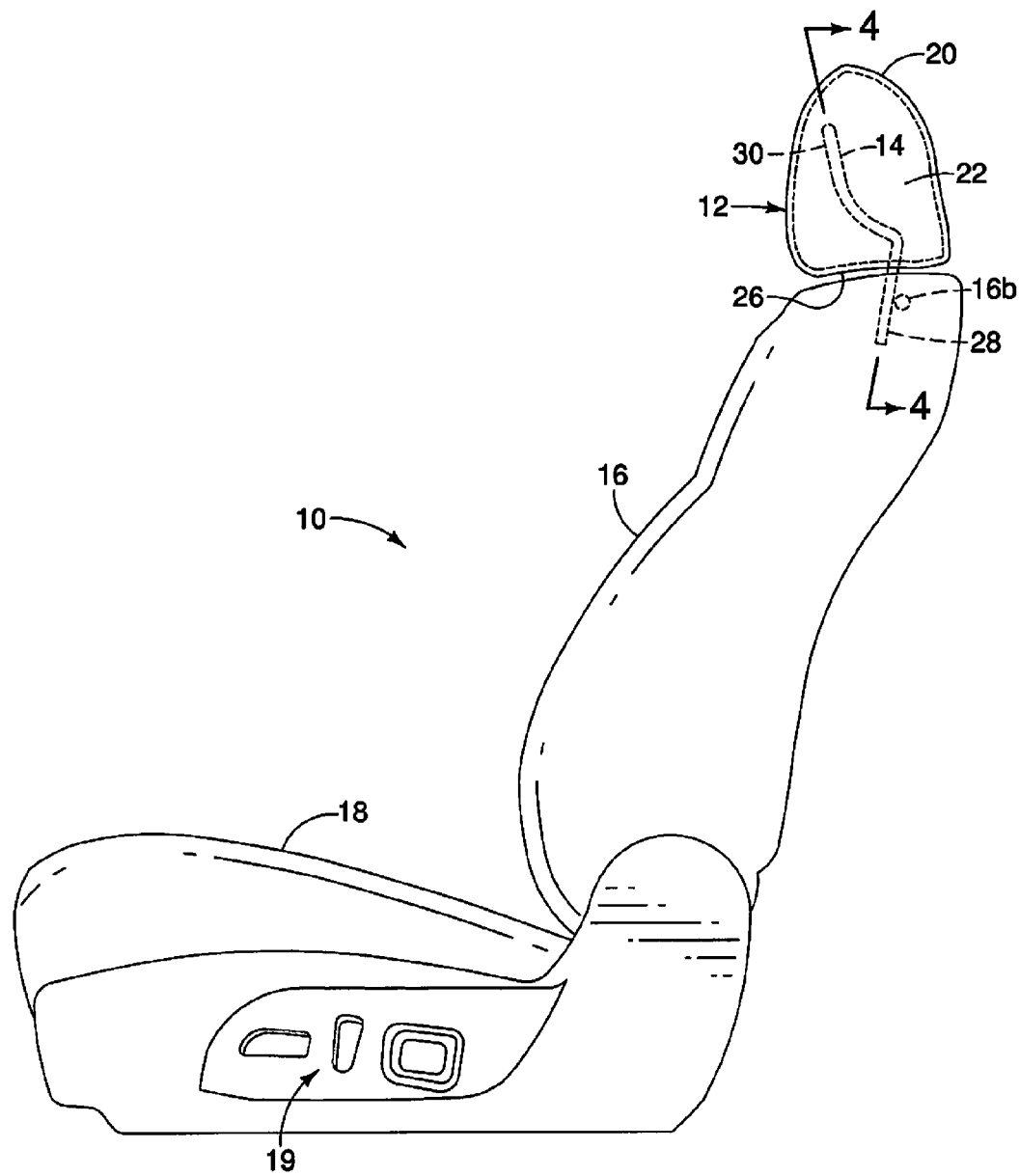
FIG. 1 is an schematic elevational side view of a vehicle seat equipped with a headrest and headrest support rod according to one embodiment.
Figure 2:
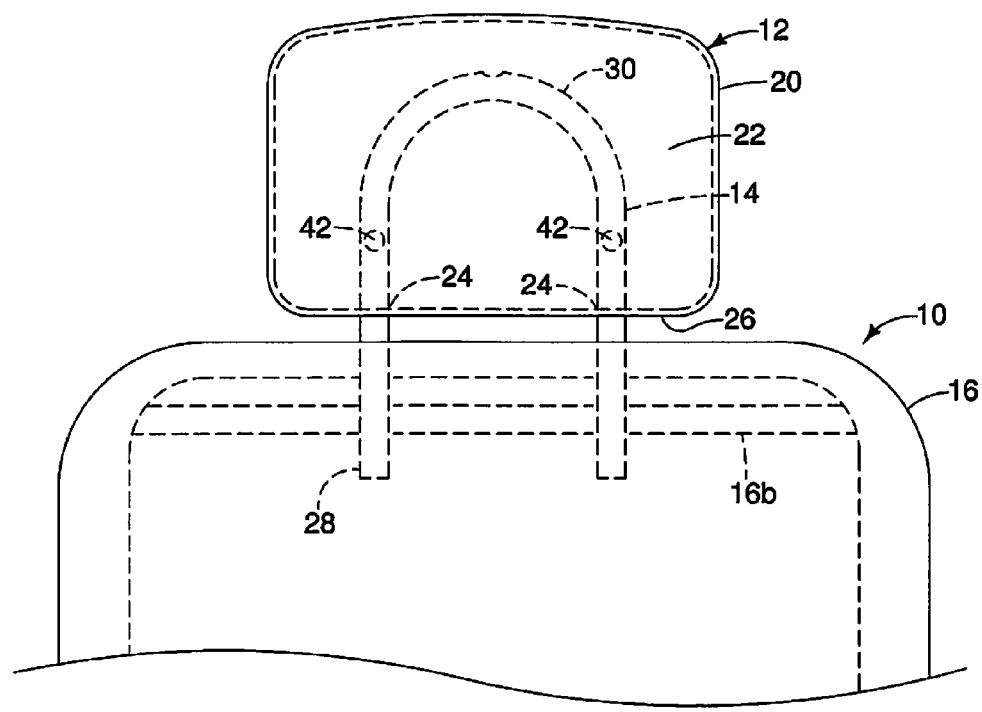
FIG. 2 is a partial back view of the vehicle seat equipped with the headrest and headrest support rod shown in FIG. 1.

Referring initially to FIGS. 1 and 2, a vehicle seat 10 equipped with a headrest 12 and headrest support rod 14 is illustrated in accordance with a first embodiment. The vehicle seat 10 generally includes a vertical back portion 16 and a horizontal seat portion 18. The vehicle seat 10 can be moved and positioned using seat control devices 19. The vehicle seat 10 can be any conventional vehicle seat 10 and is therefore not discussed in detail herein.

The headrest 12 can be part of an active or other head restraint assembly or can be any device designed to support the head of a user. The headrest 12 includes a trim cover 20 and a foam block 22 (a support block). The headrest trim cover 20 is formed from any suitable material (e.g., cloth, leather, etc.) and includes an opening 24 or a plurality of openings in the bottom 26 thereof to enable the headrest support rod 14 to be inserted therein.

The foam block 22 can be any conventional foam, and is substantially covered by the trim cover 20 and has any suitable shape. The foam block 22 is formed using an injection pump 38 (see FIG. 8), as discussed in more detail below.

As shown in FIGS. 1-7, the headrest support rod 14 is configured to support the headrest 12, and includes a first hollow tubular portion 28 and a second hollow tubular portion 30. The headrest 12 is inserted into openings in the top surface of the vertical back portion 16 of the vehicle seat 10 and is held in position with a horizontal positioning bar 16b, as shown in FIG. 2. In this embodiment, the horizontal positioning bar 16b is coupled to or otherwise allows for sliding engagement with the first hollow tubular portion 28.

Figure 4:
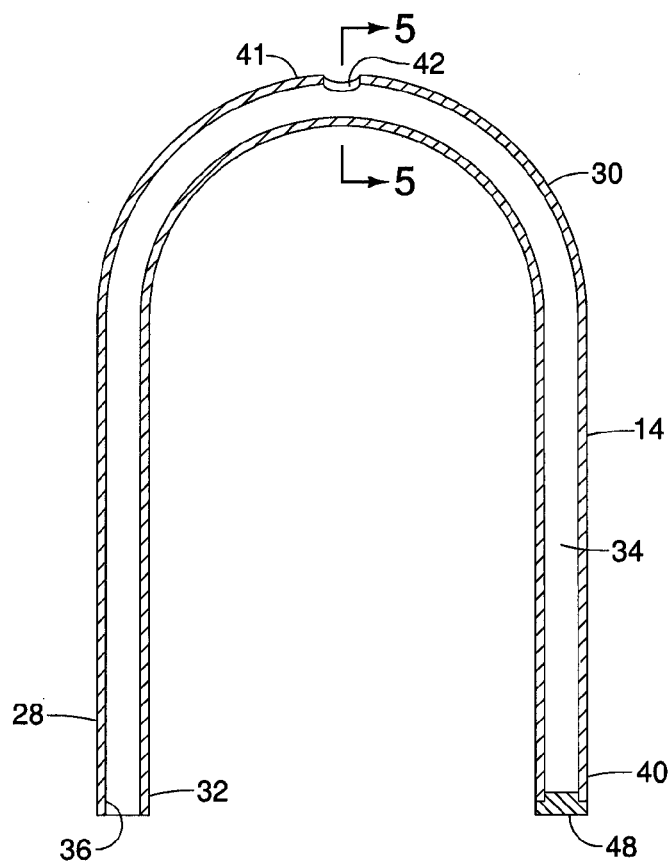
FIG. 4 is a cross-sectional view of the headrest support rod taken along lines 4-4 in FIG. 1.
Figure 5:
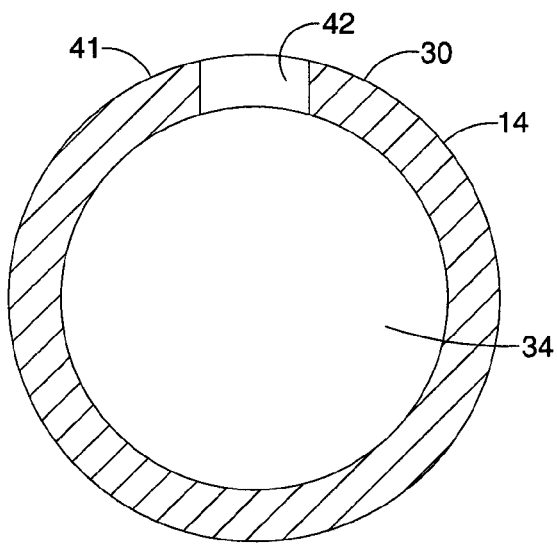
FIG. 5 is a cross-sectional view of the headrest support rod taken along lines 5-5 in FIG. 4.
Figure 7:
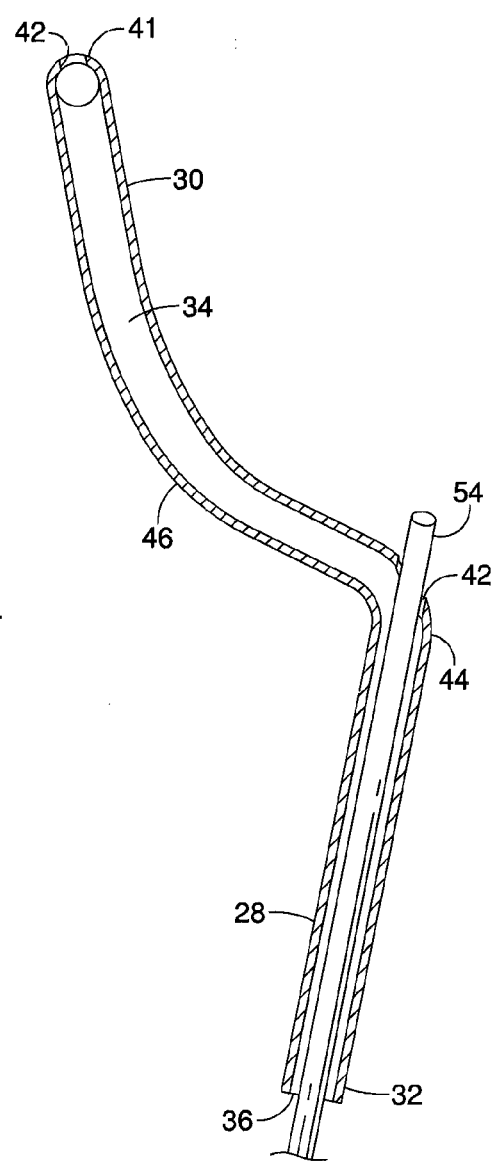
FIG. 7 is a cross-sectional view of the headrest support rod in FIG. 6 with an elongated nozzle inserted therein.

The first and second hollow tubular portions 28 and 30 are preferably a metal material, but can be any suitable material, and have a substantially uniform wall thickness and form a continuous hollow passageway 34, as shown in FIGS. 4, 5 and 7. The hollow passageway 34 has any suitable dimension that would enable foam to pass therethrough. In this embodiment, the first hollow tubular portion 28 and a second hollow tubular portion 30 are unitarily formed, for example by extrusion, but can be formed in any suitable manner.

Figure 3:
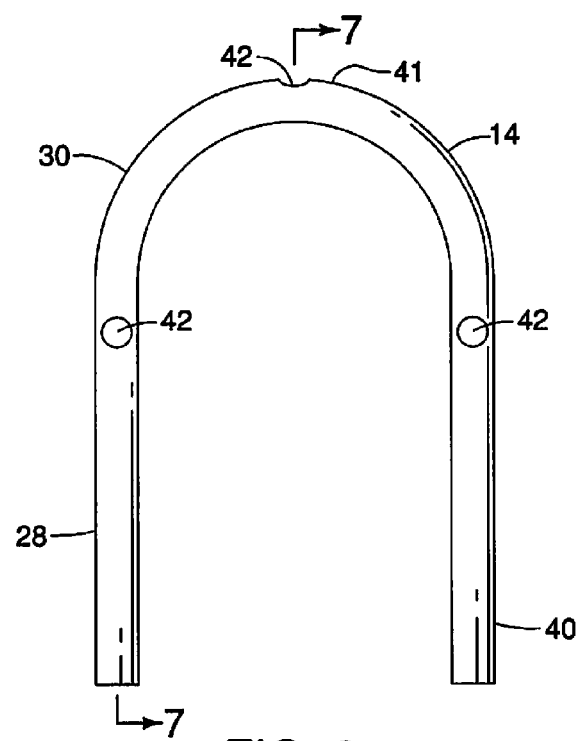
FIG. 3 illustrates the headrest support rod shown in FIG. 2.

In one embodiment, as shown in FIGS. 2 and 3, the first hollow tubular portion 28 and the second hollow tubular portion 30 form a continuous u-shaped tube, and the continuous u-shaped tube has a second end 40 that is configured to be disposed outside of the headrest 12. The second end 40 can be closed, so as to eliminate foam from exiting therethrough. The second end 40 can be permanently closed or closed by a removable plug 48, as illustrated in FIG. 4.

The first hollow tubular portion 28 includes a first end 32 having a first opening 36 configured to receive foam from an injection pump 38. The first hollow tubular portion 28 is further configured to be disposed at least partially outside of the headrest 12. In this embodiment, the first tubular portion is entirely disposed outside of the headrest 12.

Figure 6:
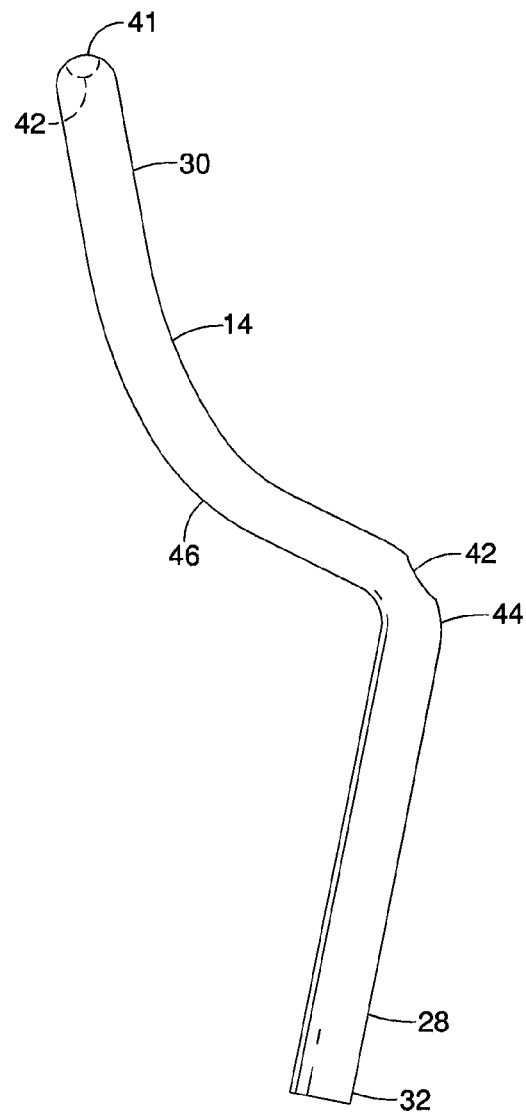
FIG. 6 is a side view of the headrest support rod shown in FIG. 3.

The second hollow tubular portion 30 includes a top (second) end 41 and at least one opening 42, and is configured to be disposed at least partially inside the headrest 12. As shown in FIGS. 6 and 7, the second hollow tubular portion 30 has a first curved portion 44 and a second curved portion 46. The first curved portion 44 extends in a forward vehicle direction. The second curved portion 46 curves upwardly away from the first hollow tubular portion 28. The first and second curved portions 44 and 46 are formed such that the top end 41 of the second hollow tubular portion 30 is not aligned with a longitudinal axis of the first hollow tubular portion 28.

The second hollow tubular portion 30 is configured so as to enable the foam to pass through the opening 42 to form the headrest 12. As illustrated in FIGS. 3, 6 and 7, the opening 42 can be one of a plurality of openings 42 and is sized and configured to enable foam to pass therethrough. In one embodiment, the opening 42 is disposed at the top (second) end 41 of the second hollow tubular portion 30. Moreover, the opening 42 can be disposed on the first curved portion 44 so as to be aligned with the first opening 36. It is noted that the opening 42 or the plurality of openings 42 may be disposed on any suitable portion of the second hollow tubular portion 30 that would enable foam to pass through the second portion and into the trim cover 20.

The openings are preferably about 1 mm to about 5 mm, and preferably less than the radius of the second hollow tubular portion 30. However, the openings can be any suitable diameter that would enable foam to pass therethrough.

Figure 8:
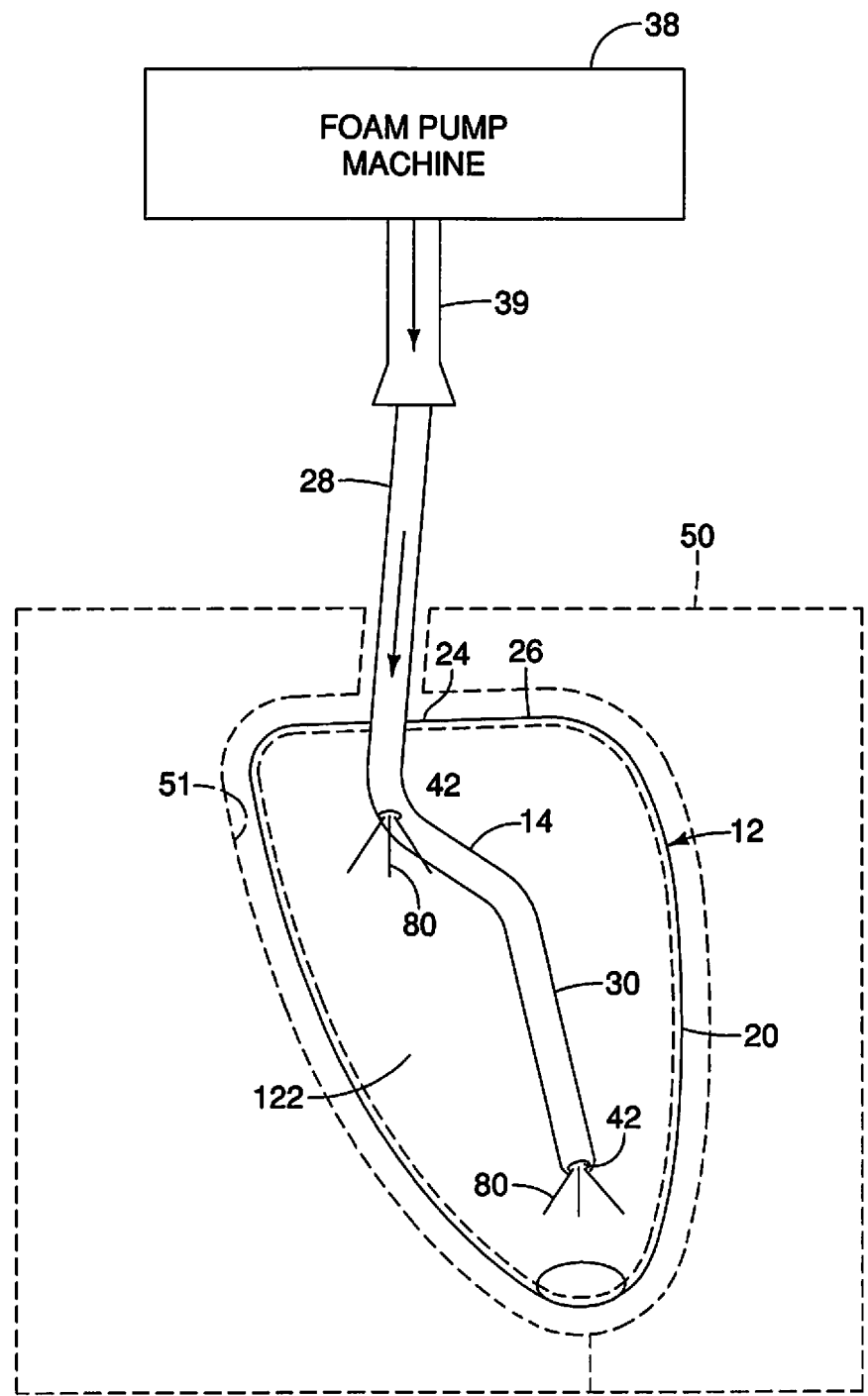
FIG. 8 illustrates the headrest support rod and headrest trim cover disposed in a mold with an injection pump capable of inserting foam through the headrest support rod, according to one embodiment.

FIG. 8 illustrates a method in which the headrest 12 according to one embodiment is formed. First, the headrest support rod 14 (e.g., a hollow rod) is inserted into the headrest trim cover 20. In this embodiment, the first hollow tubular portion 28 is arranged so as to be disposed outside the headrest trim cover 20, while the second hollow tubular portion 30 is arranged so as to be disposed inside of the trim cover 20. As illustrated in FIG. 2, the headrest support rod 14 enters the trim cover 20 through openings 24 in the bottom 26 of the trim cover 20. The trim cover 20 is then sealed around the headrest support rod 14, so as to reduce or eliminate filler material from exiting the trim cover 20 when foam is injected into the trim cover 20. While an assembly and process utilizing foam is discussed in detail, the filler material can be any desired material or combination of materials suitable for forming a support block of a headrest such as foam, gel, etc. The trim cover 20 can be sealed in any manner desired. For example, the trim cover 20 can be sealed with an interference fit between the trim cover 20 and the headrest support rod 14, or a foam insert can be attached to the headrest support rod 14.

The headrest trim cover 20 is then inserted into a mold 50, as shown in FIG. 8. The mold 50 has an interior configuration 51 that enables the headrest 12 to conform to a predetermined shape. The mold 50 is generally an injection mold with a two piece form. The foam 80 is injected using an injection pump 38 with an injection nozzle 39. The injection pump 38, injection nozzle and mold are conventional devices and are therefore not discussed in detail. If desired, multiple injection pumps 38 may be used. In such an embodiment, the plug 48 is removed, and an injection pump 38 is attached to the first end 32 and the second end 40 of the headrest support rod 14 in the configuration of a continuous u-shaped tube.

The foam 80 is injected into the headrest trim cover 20 via the opening 36 in the first end 32 of the headrest support rod 14, such that the foam 80 passes through the headrest support rod 14 and exits the headrest support rod 14 through the opening 42 in the headrest support rod 14 inside the headrest trim cover 20. The headrest 12 can then be removed from the mold 50.

In one embodiment illustrated in FIG. 7, an injection tube 54 can be inserted into the opening 36 in the first end 32 of the headrest support rod 14. As is shown in this embodiment, the injection tube 54 extends through the first hollow tubular portion 28, into the second hollow tubular portion 30 and out of the opening 42 in the first curved portion 44 of the second hollow tubular portion 30. However, it is noted that the injection tube 54 can be inserted in any manner desired and can extend as far as desired into the headrest support rod 14.

The injection tube 54 is any suitable hollow substantially straight tube that is configured to enable foam to be inserted through the opening 36 in the first end 32 of the first hollow tubular portion 28 and exit through an opening 42 in the second hollow tubular portion 30. The injection tube 54 can be attached to the injection pump 38 so as to cause the foam to be transmitted from the injection pump 38 through the injection tube 54 disposed in the headrest support rod 14 and into the trim cover 20 to form the foam block 22 of the headrest 12, as illustrated in FIG. 8.

By forming the headrest 12 in the manner described above, no additional opening is required through the trim cover 20 to inject foam. Thus, the appearance of the headrest 12 is improved.

Referring now to FIGS. 9-14 a headrest 112 and headrest support assembly 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 9:
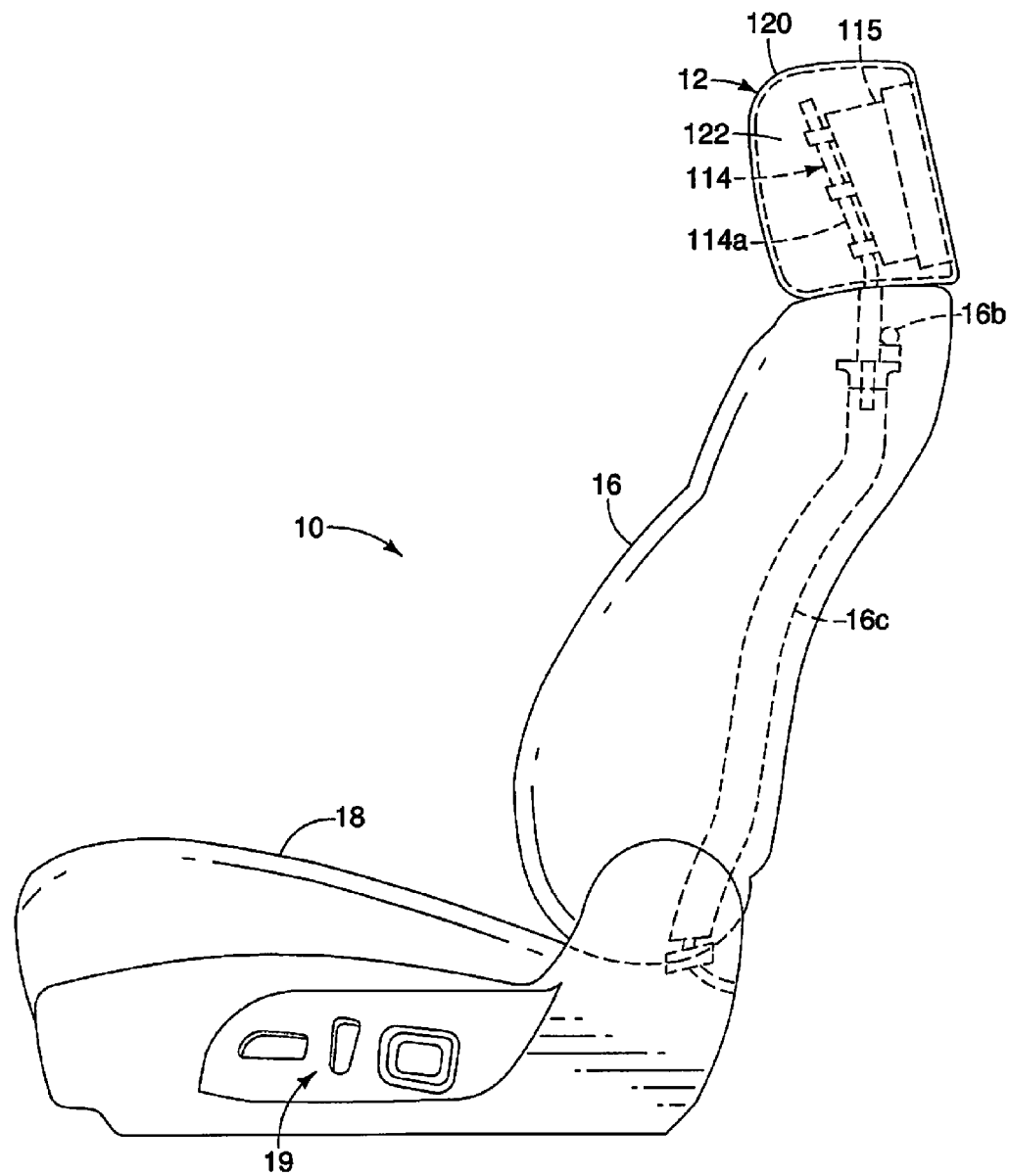
FIG. 9 is an elevational side view of a vehicle seat equipped with a headrest and headrest support rod with a display unit attached to the headrest support rod, according to one embodiment.
Figure 10:
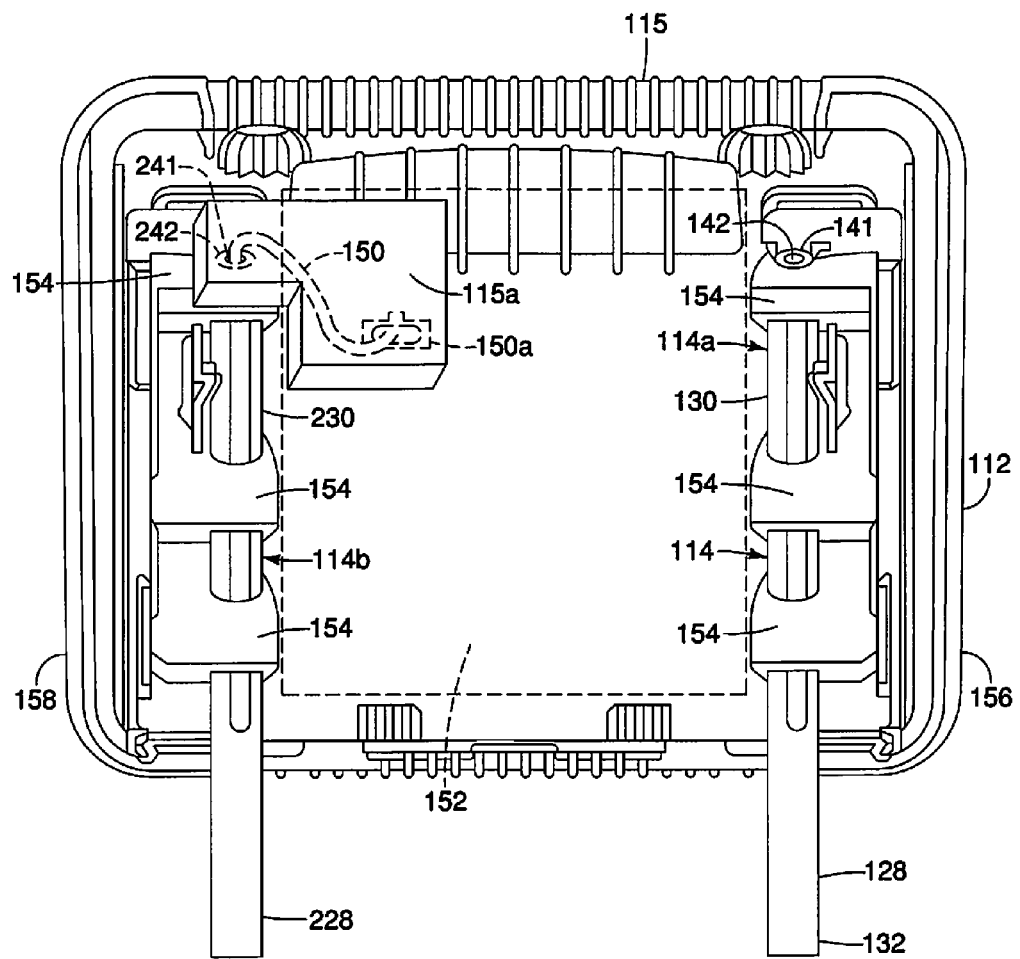
FIG. 10 is a front view of the headrest support rod of FIG. 9 with the display assembly attached thereto.

As shown in FIGS. 9 and 10, a vehicle seat 10 is equipped with a headrest 112 and headrest support assembly 114. In this embodiment, the headrest support assembly 114 is coupled to a display assembly 115. Headrest support assembly 114 includes a first headrest support rod 114a and a second headrest support rod 114b.

The seat 10, in this embodiment also includes a wiring conduit 16c to enable wires from the display assembly 115 to extend from the headrest 112 into a suitable device, such as a DVD device (not shown).

As shown in FIGS. 9 and 10, the first headrest support rod 114a is configured to enable foam to be injected through the first headrest support rod 114a and into the headrest trim cover 120 to form a foam block 122. Thus, similarly to the embodiment disclosed above, the first headrest support rod 114a has a first hollow tubular portion 128 with an opening 136 at a first end 132, and a second hollow tubular portion 130 with an opening 142 at a top (second) end 141. The first hollow tubular portion 128 is configured to be at least partially disposed outside of the trim cover 120, while the second hollow tubular portion 130 is configured to be disposed inside of the trim cover 120.

In this embodiment, the first headrest support rod 114a is substantially straight, such that the opening 136 in the first end 132 is basically aligned with the opening 142 in the top end 141. Thus, if desired, the injection tube 54, shown in FIG. 7, can be used to inject foam through the first hollow tubular portion 128 and into the second hollow tubular portion 130 in is this embodiment. That is, similar to the embodiment described above, the injection tube 54 can be inserted in to the opening 136 in the first end 132 of the first hollow tubular 130, through the tubular passageway 134, into the second hollow tubular portion 130 and out of the opening 142 in the second hollow tubular portion 130. Moreover, the alignment of the openings in the first end 132 and top end 141 increases the ease of injection of the foam, even was an injection tube is not utilized.

The second headrest support rod 114b has a structure similar to that of the first headrest support rod 114a. That is, the second headrest support rod 114b has a first hollow tubular portion 228 with an opening 236 at a first end 232, and a second hollow tubular portion 230 with an opening at a second end 241. The first hollow tubular portion 228 is configured to be at least partially disposed outside of the trim cover 120, while the second hollow tubular portion 230 is configured to be disposed inside of the trim cover 120. In this embodiment, the first and second hollow tubular portions 228 and 230 of the second headrest support rod 114b (i.e., a third hollow tubular portion) are configured to enable a wiring harness 150 to pass therethrough.

As shown in FIG. 10, electrical wires or a wiring harness 150 extends through the opening 242 and is inserted into the display assembly 115 of the display assembly 115 via a connector 150a as is known in the art. Additionally, the display assembly 115 may include a cover or plug 115a that covers the opening and protects the wiring harness 150 from the foam when the foam is injected into the headrest trim cover 120.

In this embodiment, the second headrest support rod 114b is substantially straight, such that the opening 236 in the first end 232 is basically aligned with the opening 242 in the second end 241. This structure enables the wiring harness 150 to easily pass through the first and second hollow tubular portions 128 and 130.

The display assembly 115 may be any suitable display assembly 115. For example, as illustrated in FIG. 10, the display assembly 115 is a plastic video display unit that includes a video screen 152 that is visible through an exterior surface of the headrest 112. The display assembly 115 includes brackets 154 on the left and right sides 156 and 158. The brackets 154 enable the display assembly 115 to be coupled or connected to the first and second headrest support rods 114a and 114b. However, it is noted that the display assembly 115 may be connected to the headrest support rods 114a and 114b in any desired manner.

Figure 11:
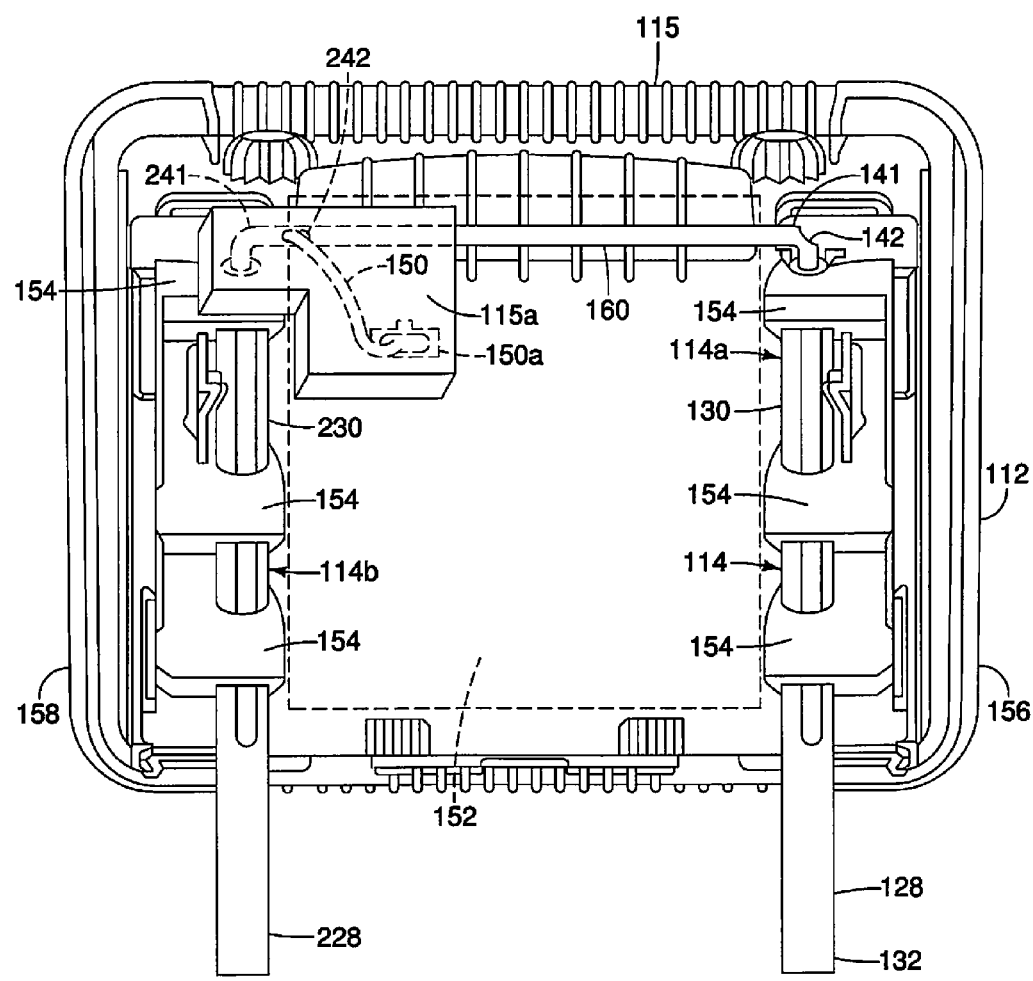
FIG. 11 is a front view of the headrest support rod according to a modified embodiment with a display assembly attached thereto.
Figure 12:
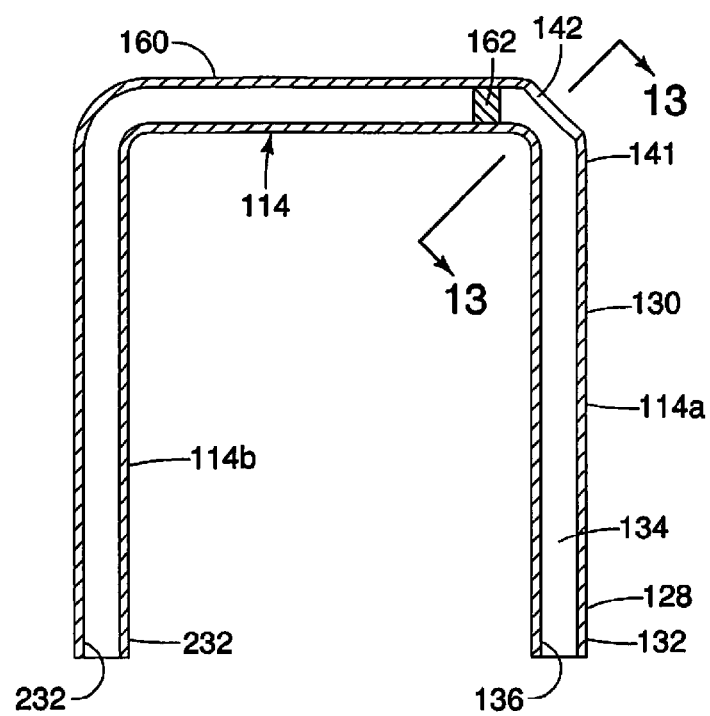
FIG. 12 is a cross-sectional view of the headrest support rod of FIG. 11.
Figure 13:
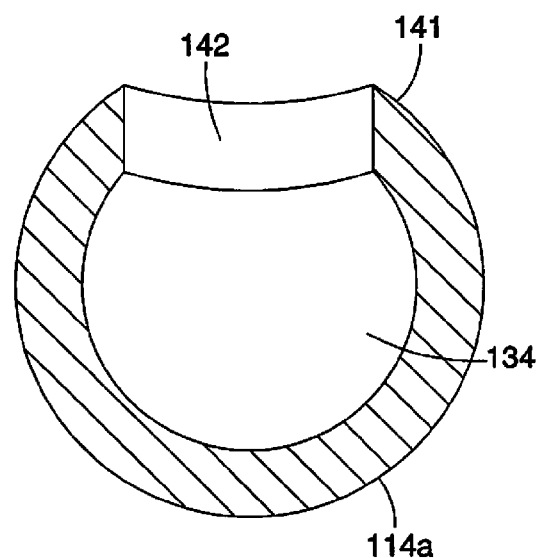
FIG. 13 is cross-sectional view of the headrest support rod taken along lines 13-13 in FIG. 12.

As shown in FIGS. 11-13, the first and second headrest support rod 114a and 114b can be connected with a transverse connecting member 160. The transverse connecting member 160 preferably extends between the top end 141 of the first headrest support rod 114a and the top end 241 of the second headrest support rod 114b; however, the transverse connecting member 160 may connect the first headrest support rod 114a with the second headrest support 114b in any manner desired.

Further, in this embodiment, the transverse connecting member 160 is shown as being hollow with a separation member 162 or wall blocking the hollow passageway 134, dividing or isolating the first headrest support rod 114a from the second headrest support rod 114b. In this embodiment, as shown in FIG. 12, the separation member 162 is disposed in the transverse connecting member 160, but the separation member 162 may be disposed in any suitable portion of the headrest support assembly 114. The separation member 162 eliminates the possibility of foam being injected into the second headrest support rod. The separation member 162 may be any size desired and may extend the entire length of the transverse connecting member 160. Thus, in one embodiment, the transverse connecting member 160 is a solid member.

As illustrated in FIGS. 11-13, the first and second hollow tubular portions 128 and 130 have one opening (142 and 242) at a respective second end 141 and 241. However, it is noted that the second hollow tubular portion 130 can have as many or as few openings 142 therein as desired. The openings 142 in second hollow tubular portion 130 may be positioned or disposed in any manner that would enable foam to be inserted therethrough. In the case of the first hollow tubular portion 128, the opening 242 can be disposed or positioned in any manner that would enable the wiring harness 150 to be inserted therethrough. Thus, as noted in FIG. 11, the opening 242 is at least partially disposed on the transverse connecting member 160.

The openings 142 and 242 are preferably about 1 mm to about 5 mm, and preferably less than the radius of a second hollow tubular portion 130 and 230. However, the openings 142 and 242 can be any suitable diameter that would enable foam to pass therethrough.

Figure 14:
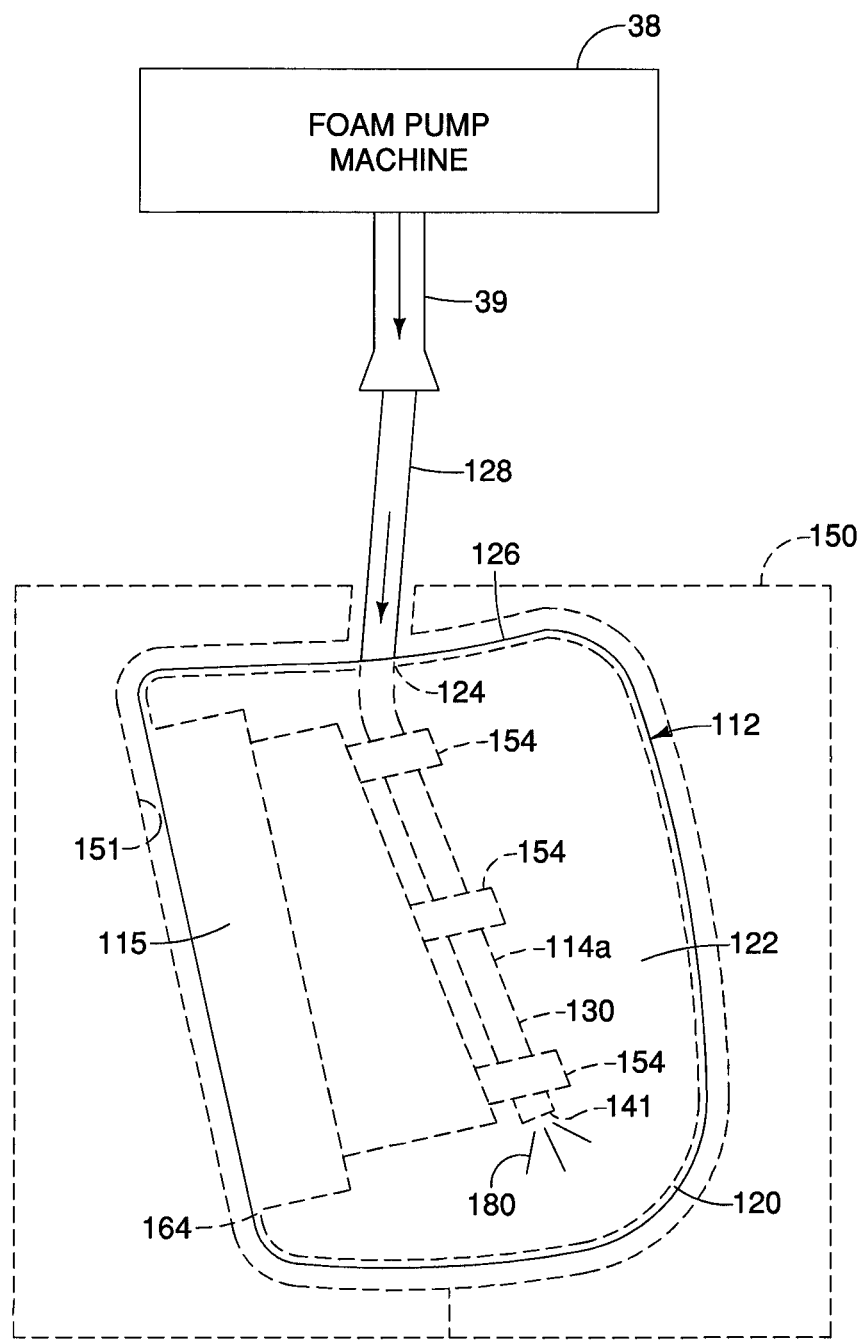
FIG. 14 illustrates the headrest support rod and headrest trim cover attached to a display assembly disposed in a mold with an injection pump capable of inserting foam through the headrest support rod, according to one embodiment.

FIG. 14 illustrates a method in which the headrest 112 according to one embodiment is formed. First, the display assembly 115 is attached to the first and second headrest support rods 114a and 114b (e.g., a hollow rod). The wiring harness 150 is routed through the second headrest support rod 114b and coupled to the display assembly 115 via the connector 150a. The cover 115a (if used) is attached to the display assembly 115 so as to cover exposed portions of the wiring harness 150. Then, the first and second headrest support rods 114a and 114b together with the display assembly 115 are inserted into the headrest trim cover 120. In this embodiment, the first hollow tubular portion 128 of the first headrest support rod 114a and the first hollow tubular portion 228 of the second headrest support rod 114b are arranged so as to be disposed outside the headrest trim cover 120, while the second hollow tubular portion 130 of the first headrest support rod 114a and the second hollow tubular portion 230 of the second headrest support rod 114b are arranged so as to be disposed inside the trim cover 120. Similarly to the embodiment discussed above, the first and second headrest support rods 114a and 114b then pass through openings 124 in the bottom 126 of the trim cover 120. Likewise, the display assembly 115 is exposed to the exterior of the headrest trim cover 120 through an opening 164 in the rear of the train cover 120. The trim cover 120 is then sealed around the headrest support rod 114a and 114b and the display assembly 115, so as to reduce or eliminate foam material from exiting the trim cover 120 when foam is injected into the trim cover 120. The trim cover 120 can be sealed in any manner desired. For example, the trim cover 120 can be sealed with an interference fit between the trim cover 120 and the headrest support assembly 114, or a foam insert can be attached to the headrest support assembly 114. Further, a bezel (not shown) or other trim component can snap into the display assembly 115 while pinching a peripheral edge of the trim cover 120 at the opening 164.

The headrest trim cover 120 is then inserted into a mold 150, as shown in FIG. 14. The mold 150 has an interior configuration 151 that enables the headrest 112 to conform to a predetermined shape. The mold 150 is generally an injection mold with a two piece form. The foam 180 is injected using an injection pump 38 with an injection nozzle 39. The injection pump 38, injection nozzle 39 and mold 150 are conventional devices and are therefore not discussed in detail.

The foam 180 is injected into the headrest trim cover 120 via the opening 136 in the first end 132 of the headrest support rod 114a, such that the foam 180 passes through the headrest support rod 114a and exits the headrest support rod through the opening 142 in the headrest support rod 114a inside the headrest trim cover 120. The headrest 112 can then be removed from the mold 150.

By forming the headrest 112 in the manner described above, no additional opening is required through the trim cover 120 to inject foam. Thus, the appearance of the headrest 112 is improved.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "above", "vertical", "horizontal", and "transverse" as well as any other similar directional terms refer to those directions of a vehicle equipped with the headrest support rod. Accordingly, these terms, as utilized to describe the present invention should be interpreted relative to a vehicle equipped with the headrest support rod.

The term "configured" as used herein to describe a component, section or part of a device includes hardware and/or software that is constructed and/or programmed to carry out the desired function.

The terms of degree such as "substantially" and "about" and as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A headrest support rod, comprising:
   a first hollow tubular portion including a first end and a second end, and having a first opening at the first end, the first opening being configured to receive filler material from an injection pump, and being configured to be disposed at least partially outside of the headrest;
   a second hollow tubular portion coupled to the first hollow tubular portion, the second hollow tubular portion including a first end, a second end, and a second opening, and being configured to be disposed at least partially inside the headrest, the second end of the second hollow tubular portion being closed,
   the first hollow tubular portion being configured to enable the filler material to be transmitted from the first opening to the second hollow tubular portion, and the second hollow tubular portion being configured so as to enable the filler material to pass through the second opening to form the headrest.

2. The headrest support rod according to claim 1, wherein the second opening is one of a plurality of spaced apart openings in the second hollow tubular portion.

3. The headrest support rod according to claim 1, wherein the second opening is in the first end of the second hollow tubular portion.

4. The headrest support rod according to claim 1, wherein the first hollow tubular portion and the second hollow tubular portion form a continuous u-shaped tube, and the second end of the second hollow tubular portion is configured to be disposed outside of the headrest.

5. The headrest support rod according to claim 1, wherein the second end of the second hollow tubular portion includes an opening that is closed by a removable plug.

6. The headrest support rod according to claim 1, wherein the second end is closed so as to eliminate foam from exiting therethrough.

7. The headrest support rod according to claim 1, wherein the first hollow tubular portion is configured to have an elongated nozzle inserted through the first end such that the elongated nozzle is at least partially disposed inside the first hollow tubular portion to enable filler material to be inserted into the headrest trim cover.

8. A headrest support rod, comprising:
a first hollow tubular portion including a first end having a first opening configured to receive filler material from an injection pump, and being configured to be disposed at least partially outside of the headrest; and
a second hollow tubular portion including a second opening and being configured to be disposed at least partially inside the headrest,
the first hollow tubular portion being configured to enable the filler material to be transmitted from the first opening to the second hollow tubular portion, and the second hollow tubular portion being configured so as to enable the filler material to pass through the second opening to form the headrest,
the second hollow tubular portion having a curved portion, such that a second end of the second hollow tubular portion is not aligned with the first hollow tubular portion, and the second opening is disposed on the curved portion so as to be aligned with the first opening.

9. A method of forming a headrest, the method comprising:
   inserting a hollow rod into a headrest trim cover;
   inserting the headrest trim cover into a mold;
   inserting an elongated nozzle through a first end of the hollow rod so as to be at least partially disposed inside the hollow rod; and
   injecting filler material into the headrest trim cover through the elongated nozzle via a first opening in a first end of the hollow rod, such that the filler material passes through the hollow rod and exits the hollow rod through a second opening in the hollow rod inside the headrest trim cover,
   the inserting the hollow rod includes inserting the hollow rod including a first hollow tubular portion and a second hollow tubular portion, the second hollow tubular portion having a curved portion, and a second end of the second hollow tubular portion is not aligned with the first hollow tubular portion, and the second opening is disposed on the curved portion so as to be aligned with the first opening.

10. The method according to claim 9, further comprising attaching a display assembly to the hollow rod, and the inserting the hollow rod into the headrest includes the hollow rod attached to the display assembly into the headrest trim cover.

11. The method according to claim 9, further comprising securing the headrest trim cover around the exterior surface of the hollow rod prior to the inserting the headrest trim cover into a mold.

12. The method according to claim 9, wherein the hollow rod is continuous and u-shaped and has a second end that is configured to be disposed outside of the headrest.

13. The method according to claim 9, wherein a second end of the hollow rod is closed.

14. The method according to claim 13, wherein the second end includes an opening that is closed by a removable plug.

* * * * *